(12) United States Patent
Roosli et al.

(10) Patent No.: US 10,925,028 B2
(45) Date of Patent: *Feb. 16, 2021

(54) SYSTEM AND METHOD FOR MONITORING IDENTIFICATION AND POSITION OF DEVICES USING RADIO FINGERPRINTING

(71) Applicant: Honeywell International Inc., Morris Plains, NJ (US)

(72) Inventors: Philipp Anton Roosli, Niantic, CT (US); Bhavesh Gupta, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/748,992

(22) Filed: Jan. 22, 2020

(65) Prior Publication Data

US 2020/0359351 A1 Nov. 12, 2020

Related U.S. Application Data

(63) Continuation of application No. 16/409,180, filed on May 10, 2019, now Pat. No. 10,555,274.

(51) Int. Cl.
| | | |
|---|---|---|
| *H04W 64/00* | (2009.01) | |
| *H04W 24/00* | (2009.01) | |
| *H04W 48/12* | (2009.01) | |
| *H04W 24/02* | (2009.01) | |
| *H04B 17/318* | (2015.01) | |

(52) U.S. Cl.
CPC .......... *H04W 64/00* (2013.01); *H04B 17/318* (2015.01); *H04W 24/00* (2013.01);
(Continued)

(58) Field of Classification Search
CPC ..... H04W 64/00; H04W 24/00; H04W 24/02; H04W 24/04; H04W 12/0806; H04W 12/08; H04W 48/12; H04W 12/00; H04W 12/06; H04W 12/00524; H04W 4/33; H04W 64/003; H04W 4/30; H04W 4/38;
(Continued)

(56) References Cited

U.S. PATENT DOCUMENTS

| | | |
|---|---|---|
| 8,618,928 B2 | 12/2013 | Weed et al. |
| 9,942,788 B1 | 4/2018 | Zeine et al. |

(Continued)

FOREIGN PATENT DOCUMENTS

| | | |
|---|---|---|
| CA | 2717866 A1 | 9/2009 |

*Primary Examiner* — Meless N Zewdu
(74) *Attorney, Agent, or Firm* — Seager, Tufte & Wickhem LLP

(57) ABSTRACT

A device for monitoring an identification and positioning system may comprise a transceiver and a controller operatively coupled to a memory. The controller may be configured to receive a status signal from the transceiver indicative of an inspection of a component, obtain an identity of the component, a location of the component, and a signal strength of a signal produced by the component, access a record from the memory, determine whether the record includes an identity of the component or a location of the component that matches the obtained identity or location of the component, observe a difference in the obtained signal strength and a signal strength from the record, and send a notification of an issue concerning the component when the difference is outside a range.

20 Claims, 6 Drawing Sheets

(52) U.S. Cl.
CPC ........... *H04W 24/02* (2013.01); *H04W 48/12* (2013.01); *H04W 64/003* (2013.01)

(58) Field of Classification Search
CPC ... H04W 4/50; H04W 4/20; H04W 12/00522; H04W 4/02; H04W 4/021; H04W 4/023; H04W 4/029; H04L 12/28; H04L 12/2803; H04L 29/06; H04L 12/2816; H04L 12/2895; H05B 33/08; G06K 9/00; G01S 1/00; G01S 1/02; G01S 1/022; G01S 1/024; G01S 1/026; G01S 5/013; G01S 5/014; G01S 5/016; H04B 17/318
See application file for complete search history.

(56) References Cited

U.S. PATENT DOCUMENTS

| | | |
|---|---|---|
| 9,961,507 B1 | 5/2018 | Mendelson |
| 10,085,121 B1 | 9/2018 | Chokshi et al. |
| 10,122,736 B2 * | 11/2018 | Baxley et al. ...... H04L 63/1416 |
| 10,555,274 B1 * | 2/2020 | Roosli et al. ......... H04W 64/00 |
| 2006/0099963 A1 | 5/2006 | Stephens |
| 2008/0039040 A1 | 2/2008 | Patel et al. |
| 2008/0046286 A1 | 2/2008 | Halsted |
| 2009/0280826 A1 | 11/2009 | Malik et al. |
| 2012/0330603 A1 * | 12/2012 | Bevan et al. .................. 702/150 |
| 2013/0225197 A1 * | 8/2013 | McGrogor et al. ........ 455/456.1 |
| 2013/0241918 A1 | 9/2013 | Satyan |
| 2014/0018095 A1 * | 1/2014 | Parvizi et al. ......... H04W 4/025 |
| 2014/0066043 A1 * | 3/2014 | Mathews .............. H04W 4/021 |
| 2015/0081583 A1 * | 3/2015 | Butler et al. ........ G06Q 10/0853 |
| 2015/0334676 A1 * | 11/2015 | Hart et al. ........... H04W 64/00 |
| 2016/0316342 A1 * | 10/2016 | Narasimhan et al. .. H04W 4/04 |
| 2017/0012720 A1 | 1/2017 | Skaaksrud et al. |
| 2017/0188188 A1 * | 6/2017 | Kang .................... H04W 4/021 |
| 2018/0158288 A1 | 6/2018 | Logan et al. |
| 2018/0338252 A1 | 11/2018 | Zeine et al. |
| 2018/0376292 A1 * | 12/2018 | Ivanov et al. .......... H04W 4/04 |
| 2019/0035242 A1 | 1/2019 | Vazirani |

* cited by examiner

| Component Fingerprint Record | | |
|---|---|---|
| Component ID | Component location | Signal Strength |
| Router 204 | Outside Room 101 | 50mW |
| Router 206 | Outside Room 105 | 60mW |
| Router 208 | Outside Room 109 | 40mW |
| Router 210 | Outside Room 113 | 40mW |
| Router 212 | Outside Room 115 | 50mW |
| Router 214 | Between Room 101 & 102 | 40mW |
| Router 216 | Between Room 105 & 106 | 60mW |
| Router 218 | Between Room 109 & 110 | 50mW |
| Router 220 | Between Room 113 & 114 | 50mW |
| Router 222 | Between Room 115 & 116 | 50mW |
| Router 224 | Outside Room 102 | 40mW |
| Router 226 | Outside Room 106 | 60mW |
| Router 228 | Outside Room 110 | 60mW |
| Router 230 | Outside Room 114 | 40mW |
| Router 232 | Outside Room 116 | 50mW |

FIG. 2B

| Component Fingerprint Record | | |
|---|---|---|
| Component ID | Component location | Signal Strength |
| Thermostat 304 | In Room 101 | 50mW |
| Thermostat 306 | In Room 103 | 60mW |
| Thermostat 308 | In Room 105 | 40mW |
| Thermostat 310 | In Room 107 | 50mW |
| Thermostat 312 | In Room 109 | 50mW |
| Thermostat 314 | In Room 111 | 60mW |
| Thermostat 316 | In Room 113 | 50mW |
| Thermostat 318 | In Room 115 | 40mW |
| Thermostat 320 | In Room 102 | 40mW |
| Thermostat 322 | In Room 104 | 40mW |
| Thermostat 324 | In Room 106 | 60mW |
| Thermostat 326 | In Room 108 | 40mW |
| Thermostat 328 | In Room 110 | 50mW |
| Thermostat 330 | In Room 112 | 50mW |
| Thermostat 332 | In Room 114 | 60mW |
| Thermostat 334 | In Room 116 | 60mW |
| Remote HVAC Controller 336 | Outside Room 101 | 50mW |
| Remote HVAC Controller 338 | Outside Room 105 | 40mW |
| Remote HVAC Controller 340 | Outside Room 109 | 40mW |
| Remote HVAC Controller 342 | Outside Room 113 | 50mW |
| Remote HVAC Controller 344 | Outside Room 115 | 60mW |
| Remote HVAC Controller 346 | Between Room 101 & 102 | 50mW |
| Remote HVAC Controller 348 | Between Room 105 & 106 | 50mW |
| Remote HVAC Controller 350 | Between Room 109 & 110 | 50mW |
| Remote HVAC Controller 352 | Between Room 113 & 114 | 50mW |
| Remote HVAC Controller 354 | Between Room 115 & 116 | 60mW |
| Remote HVAC Controller 356 | Outside Room 102 | 60mW |
| Remote HVAC Controller 358 | Outside Room 106 | 40mW |
| Remote HVAC Controller 360 | Outside Room 110 | 60mW |
| Remote HVAC Controller 362 | Outside Room 114 | 50mW |
| Remote HVAC Controller 364 | Outside Room 116 | 50mW |

FIG. 3B

SYSTEM AND METHOD FOR MONITORING
IDENTIFICATION AND POSITION OF
DEVICES USING RADIO FINGERPRINTING

This application is a continuation of U.S. patent application Ser. No. 16/409,180, filed May 10, 2019. U.S. patent application Ser. No. 16/409,180, filed May 10, 2019, is hereby incorporated by reference.

TECHNICAL FIELD

The disclosure relates generally to identification and positioning systems, and more particularly to monitoring identification and positioning systems.

BACKGROUND

Radio fingerprinting is a process that identifies a device or radio transmitter by the "fingerprint" that characterizes its signal transmission and is hard to imitate. An electronic fingerprint makes it possible to identify the device by its signals/transmission characteristics. Radio fingerprinting is commonly used to prevent one device from replicating another device. Essentially, a device has a rise time signature when first keyed caused by the slight variations of component values during manufacture. Once the rise time signature is captured a beacon is assigned to the device and the device is easily detectable by its beacon. However, over time, devices may deteriorate as the devices are tampered with, replaced with spare parts, fail or otherwise change their beaconing properties. A particular concern of a device is whether it remains present at its original and intended location. For example, if the batteries of a device are not replaced, they may become inoperable. On the other hand, a failed device may be fixed or replaced with a spare part but a newly resulting repaired device does not necessarily continue to have a detectable beacon. A desirable solution is to assure a beaconing infrastructure that has long-term stability to provide a consistent identification and positioning system.

SUMMARY

This disclosure relates generally to monitoring an identification and positioning system. In one example, a device for monitoring an identification and positioning system of a structure may comprise a transceiver configured to inspect the identification and positioning system and a controller operatively coupled to the transceiver and a memory, the memory having a record that includes identities of components from the identification and positioning system, locations of the components throughout the structure, and signal strengths of signals produced by the components. In some cases, the controller may be configured to receive a status signal from the transceiver indicative of an inspection of a component of the components from the identification and positioning system, obtain, from the status signal, an identity of the component, a location of the component, and a signal strength of a signal produced by the component, access the record from the memory, determine whether an entry from the record includes an identity of the component or a location of the component that matches the obtained identity of the component or the obtained location of the component from the status signal, observe a difference in the obtained signal strength of the signal produced by the component and a signal strength from the entry when either the identity of the component or the location of the component from the entry matches the obtained identity of the component or the obtained location of the component from the status signal, and send a notification of an issue concerning the component when the difference in the obtained signal strength of the signal produced by the component and the signal strength from the entry is outside a range.

Alternatively or additionally to the foregoing, when the location of the component from the entry matches the obtained location of the component from the status signal and the identity of the component from the entry does not match the obtained identity of the component from the status signal, the controller may be further configured to update the identity of the component from the entry to the identity of the component from the status signal.

Alternatively or additionally to any of the embodiments above, when the identity of the component from the entry matches the obtained identity of the component from the status signal and the location of the component from the entry does not match the obtained location of the component from the status signal, the controller may be further configured to send a notification that the location of the component has changed.

Alternatively or additionally to any of the embodiments above, the notification that the location of the component has changed further may include that the change in the location of the component may be a cause of the issue concerning the component when the difference in the obtained signal strength of the signal produced by the component and the signal strength from the entry is outside a range.

Alternatively or additionally to any of the embodiments above, when the obtained location of the component from the status signal and the obtained identity of the component from the status signal do not match any entry in the record, the controller may be further configured to update the record to include the identity of the component, the location of the component, and the signal strength of the signal produced by the component.

Alternatively or additionally to any of the embodiments above, the device is a router and the inspection of the component is done by using a Bluetooth signal exchanged between the router and the component and the notification of the issue concerning the component is sent by the router using a long area communication signal.

Alternatively or additionally to any of the embodiments above, the long area communication signal may comprise a Zigbee signal.

Alternatively or additionally to any of the embodiments above, the long area communication signal may comprise a radio signal.

Alternatively or additionally to any of the embodiments above, the device may be a computing device and receives the status signal comprising a Zigbee signal from a router and the router performs the inspection of the component by exchanging a Bluetooth signal with the component.

Alternatively or additionally to any of the embodiments above, the device may be a computing device and receives the status signal from a beacon and the beacon performs the inspection of the component by exchanging a first Bluetooth signal with the component.

Alternatively or additionally to any of the embodiments above, the status signal may comprise a second Bluetooth signal and the beacon is included in a thermometer.

In another example, an identification and positioning system of a structure may comprise a set of components of the identification and positioning system and a device. In some cases, the device may include an transceiver configured to inspect a component from the set of components of the identification and positioning system and a controller operatively coupled to the transceiver and a memory, the memory having a record that includes identities of the set components, locations of the set of components throughout the structure, and signal strengths of signals produced by the set of components. In some cases, the controller may be configured to receive a status signal from the transceiver indicative of an inspection of the component, obtain, from the status signal, an identity of the component, a location of the component, and a signal strength of a signal produced by the component, access the record from the memory, determine whether an entry from the record includes an identity of the component or a location of the component that matches the obtained identity of the component or the obtained location of the component from the status signal, observe a difference in the obtained signal strength of the signal produced by the component and a signal strength from the entry when either the identity of the component or the location of the component from the entry matches the obtained identity of the component or the obtained location of the component from the status signal, and send a notification of an issue concerning the component when the difference in the obtained signal strength of the signal produced by the component and the signal strength from the entry is outside a range.

Alternatively or additionally to any of the embodiments above, when the location of the component from the entry matches the obtained location of the component from the status signal and the identity of the component from the entry does not match the obtained identity of the component from the status signal, the controller may be further configured to update the identity of the component from the entry to the identity of the component from the status signal.

Alternatively or additionally to any of the embodiments above, when the identity of the component from the entry matches the obtained identity of the component from the status signal and the location of the component from the entry does not match the obtained location of the component from the status signal, the controller may be further configured to send a notification that the location of the component has changed.

Alternatively or additionally to any of the embodiments above, the notification that the location of the component has changed may further include that the change in the location of the component may be a cause of the issue concerning the component when the difference in the obtained signal strength of the signal produced by the component and the signal strength from the entry is outside a range.

Alternatively or additionally to any of the embodiments above, when the obtained location of the component from the status signal and the obtained identity of the component from the status signal do not match any entry in the record, the controller may be further configured to update the record to include the identity of the component, the location of the component, and the signal strength of the signal produced by the component.

Alternatively or additionally to any of the embodiments above, the device may be a router and the inspection of the component is done by using a Bluetooth signal exchanged between the router and the component and the notification of the issue concerning the component may be sent by the router using a long area communication signal.

Alternatively or additionally to any of the embodiments above, the device may be a computing device and receives the status signal comprising a Zigbee signal from a router and the router performs the inspection of the component by exchanging a Bluetooth signal with the component.

Alternatively or additionally to any of the embodiments above, the device may be a computing device and receives the status signal from a beacon and the beacon performs the inspection of the component by exchanging a first Bluetooth signal with the component.

In another example, a method of monitoring an identification and positioning system of a structure may comprise receiving a status signal from a transceiver indicative of an inspection of a component from the identification and positioning system, obtaining, from the status signal, an identity of the component, a location of the component relative to the structure, and a signal strength of a signal produced by the component, accessing a record from a memory, determining whether an entry from the record includes an identity of the component or a location of the component that matches the obtained identity of the component or the obtained location of the component from the status signal, observing a difference in the obtained signal strength of the signal produced by the component and a signal strength from the entry when either the identity of the component or the location of the component from the entry matches the obtained identity of the component or the obtained location of the component from the status signal, and sending a notification of an issue concerning the component when the difference in the obtained signal strength of the signal produced by the component and the signal strength from the entry is outside a range.

The above summary of some illustrative embodiments is not intended to describe each disclosed embodiment or every implementation of the present disclosure. The Figures and Description which follow more particularly exemplify these and other illustrative embodiments.

BRIEF DESCRIPTION OF THE FIGURES

The disclosure may be more completely understood in consideration of the following description in connection with the accompanying drawings, in which:

FIG. 2B is an example of a respective received signal strength indicator (RSSI) component fingerprint record;

FIG. 3B is another example of a RSSI component fingerprint record;

Figure 1:
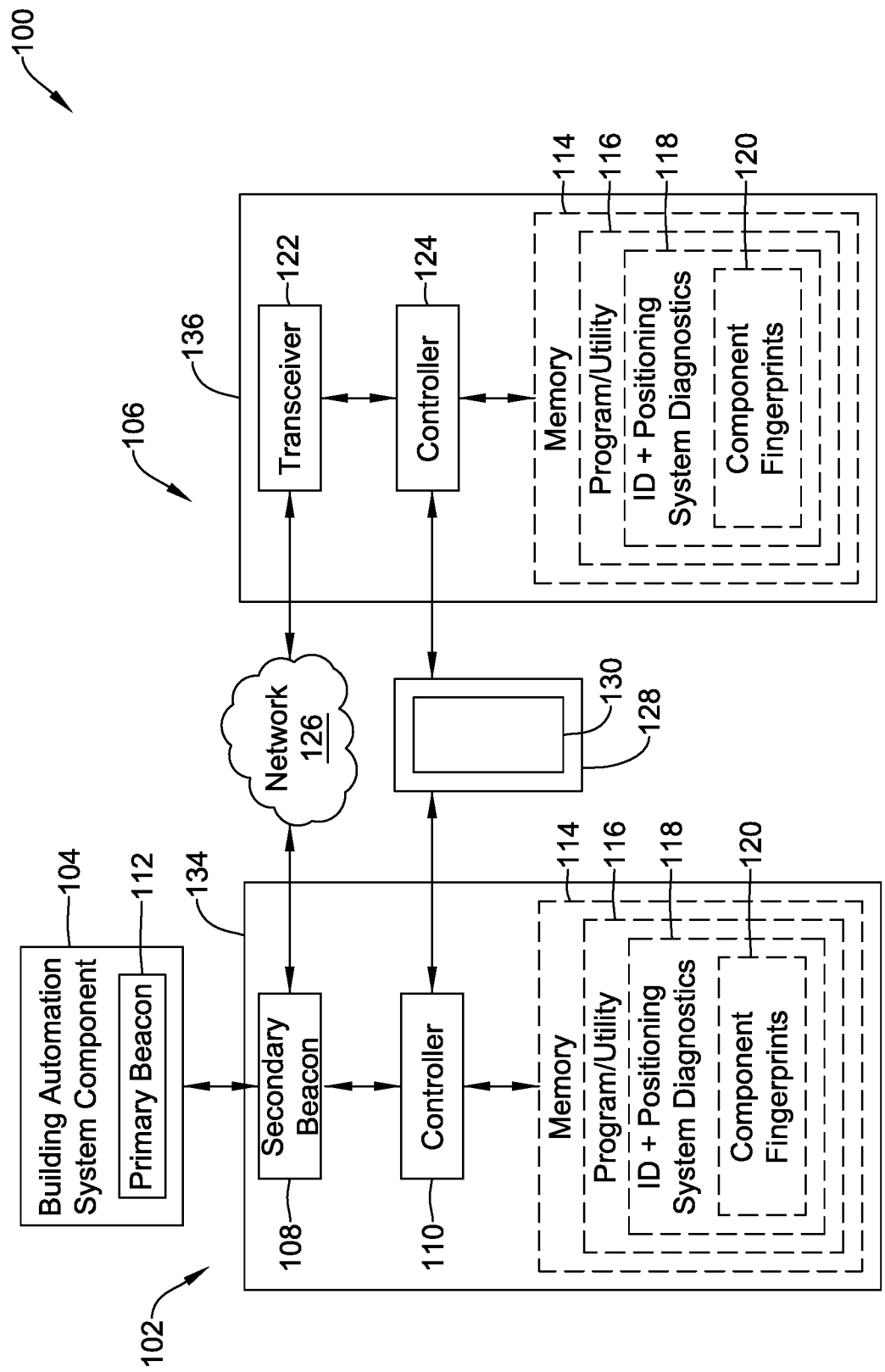
FIG. 1 is a schematic view of an identification and positioning system.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about," whether or not explicitly indicated. The term "about" generally refers to a range of numbers that one of skill in the art would consider equivalent to the recited value (i.e., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following description should be read with reference to the drawings in which similar structures in different drawings are numbered the same. The drawings, which are not necessarily to scale, depict illustrative embodiments and are not intended to limit the scope of the disclosure.

Certain embodiments of the present disclosure may be found in a device, a system, a method, and/or a non-transitory computer-readable storage medium with an executable program stored thereon for monitoring an identification (ID) and positioning system. In various embodiments, controller(s) may be configured to inspect components of the ID and positioning system and determine issues with the components that may be altering the performance of the ID and positioning system. In this regard, this disclosure describes controllers, systems, methods, and executable programs that perform fault detection or operation diagnostics on a beacon infrastructure supporting an ID and positioning system to provide a more reliable ID and positioning system.

A building automation system (BAS) may include, but is not limited to Heating, Ventilation, and/or Air Conditioning (HVAC) systems, security systems, a fire systems, access control systems, a lighting systems, and mapping systems. In some cases, components or devices of the BAS may be deployed around a structure or a building using a "radio fingerprinting" process. As such, each component may have a "fingerprint" that provides the identity, the location, and signal characteristics (e.g., signal strength) of each component. Accordingly, in some instances, the deployed components may establish a beacon infrastructure for an ID and positioning system that is in incorporated within the BAS and provides the means for controlling the operation of the other systems within the BAS.

For example, in some embodiments, an HVAC system may include one or more HVAC control devices (e.g., thermostats, Air Handing Units (AHU), Variable-Air-Volume (VAV) units, dampers, valves, fans, heating units, cooling units, sensors, humidifiers, dehumidifiers etc.) that may be deployed throughout a structure using a fingerprinting process. As such, in some cases, a fingerprint for some or all of the HVAC devices may be obtained. Accordingly, the HVAC devices may provide the beacon infrastructure for an ID and positioning system that allows for the monitoring and/or control of temperature and/or other environmental conditions in the structure based on the detection of whether a device(s) is present.

In another example, a security system may include sensors, alarm devices, audio/visual devices, lights, and/or contact sensors that may be deployed throughout a structure using a fingerprinting process. As such, in some cases, a fingerprint for some or all of the security system devices may be obtained. Accordingly, the security system control devices may provide the beacon infrastructure for an ID and positioning system that allows for monitoring and/or control of the state of doors and windows, security card pass systems, electronic locks, etc. based on the detection of whether a device(s) is present.

In another example, a fire system may include smoke/heat sensors, a sprinkler system, warning lights, etc., that may be deployed throughout a structure using a fingerprinting process. As such, in some cases, a fingerprint for some or all of the fire system devices may be obtained. Accordingly, the fire system control devices may provide the beacon infrastructure for an ID and positioning system that allows for monitoring and/or control of the state of the sensors, the lights, etc. based on the detection of whether a device(s) is present.

In another example, an access control system may include doors, door locks, windows, window locks, turnstiles, parking gates, elevators, or other physical barrier, where granting access can be electronically controlled, may be deployed throughout a structure using a fingerprinting process. As such, in some cases, a fingerprint for some or all of the access control system devices may be obtained. Accordingly, the access control system devices may provide the beacon infrastructure for an ID and positioning system that allows for monitoring and/or control of the electronically controlled barriers based on the detection of whether a device(s) is present.

In another example, a lighting system may include emergency lights, outlets, lighting, drapes, and general load switching, some of which are subject to "dimming" control which varies the amount of power provided to the various building control devices, may be deployed throughout a structure using a fingerprinting process. As such, in some cases, a fingerprint for some or all of the lighting system devices may be obtained. Accordingly, the lighting system devices may provide the beacon infrastructure for an ID and positioning system that allows for monitoring and/or control of the lights, outlets, general load switching, etc. based on the detection of whether a device(s) is present.

These are just a few examples of system devices that provide the beacon infrastructure for an ID and positioning system. In some cases, the BAS may also include low voltage devices that may include, but are not limited to, garage doors, lawn sprinklers, exterior lights, and pool/spa heaters (via a relay or the like).

In some cases, components or devices of the beacon infrastructure may experience issues that alter the performance of the ID and positioning system and thus, the operation of the building automation system or systems. For example, in some instances, the components may deteriorate over time, the components may be tampered with, the components may have parts replaced, the components may be moved or misplaced, new components may be added to the ID and positioning system, and/or components may fail or otherwise change their beaconing properties. Accordingly, to help provide a long-term, stable, ID and positioning system, the fingerprints of the components may be routinely compared against the current signals being produced by the components. As such, differences or discrepancies between the current signals and the fingerprints may reveal issues regarding the components and notifications may be generated such that the components may be timely serviced and allow the ID and positioning system and the BAS to continue to operate efficiently and effectively.

FIG. 1 is a schematic block diagram of an illustrative identification (ID) and positioning system 100. In the example shown, the ID and positioning system 100 includes a building control device 102, a building automation system (BAS) component 104, and a remote device 106. In some examples, the building control device 102 may be a router, a thermostat, a sensor (e.g., a motion sensor, a light sensor, etc.), a smoke detector, or any other suitable device. In some cases, a controller 110 (e.g., microcontroller, microprocessor, etc.) of the building control device 102 may be operatively coupled to a secondary beacon 108 (e.g., a transceiver) and to memory 114. In some examples, the memory 114 may be optionally included in a housing 134 of the building control device 102, in a housing 136 of the remote device 106, or on another device (not shown) that is accessible to either the building control device 102 or the remote device 106 (e.g., accessible via a network 126).

The secondary beacon 108 may be configured to communicate with a primary beacon 112 (e.g., a transceiver) of the remotely located BAS component 104 (e.g., HVAC unit, security unit, lighting unit, fire unit, access control unit, etc.) using one or more wireless communication protocols, such as cellular communication, ZigBee, REDLINK™, Bluetooth, Wi-Fi, IrDA, infra-red (IR), dedicated short range communication (DSRC), EnOcean, radio frequency (RF) signals and/or any other suitable common or proprietary wireless protocol, as desired. In certain embodiments, the secondary beacon 108 may inspect the BAS component 104 and/or the primary beacon 112 by exchanging communication signals (e.g., Bluetooth signals) with the primary beacon 112. Accordingly, the secondary beacon 108 may then send a status signal to the controller 110 indicative of the inspection of the component. For example, in certain embodiments, the primary beacon 112 may be included in an HVAC unit through a standard fingerprinting process used to establish the beacon infrastructure for the ID and positioning system 100. Moreover, the HVAC unit may be programmed to control the temperature of a room in a building at one temperature (e.g., 70° F.) when an occupier of the room is present and control the temperature of the room at a second temperature (e.g., 65° F.) when the occupier of the room is not present. Accordingly, through the fingerprinting process, the primary beacon 112 may be capable of recognizing a mobile device of the occupier of the room when the occupier is in the room. As such, the primary beacon 112 may notify the HVAC unit, such as for example, an onboard controller of the HVAC unit, that the occupier is present. The HVAC unit may then control the temperature of the room to be at 70° F. Additionally, when the primary beacon 112 does not recognize the mobile device of the occupier, meaning the occupier is not present in the room, the HVAC unit may control the temperature of the room to be at 65° F.

Continuing with the current example, in some cases, the building control device 102 may be a router. As such, the router may be configured to communicate with the HVAC unit by exchanging Bluetooth signals between the primary beacon 112 and the secondary beacon 108. In some cases, through the fingerprint process, the Bluetooth signals may have information that includes, but is not limited to, the identity of HVAC unit, the location of the HVAC unit in a structure or building, and the signal characteristics (e.g., signal strength) of the Bluetooth signals sent by the primary beacon 112. As such, when the secondary beacon 108 receives a Bluetooth signal from the primary beacon 112, the secondary beacon 108 may send a status signal to the controller 110 that includes the identity of HVAC unit, the location of the HVAC unit, and the signal strength of the Bluetooth signal received from the primary beacon 112. This is just one example of a particular BAS component (i.e., the HVAC unit) that can be used to establish the ID and positioning system 100. Moreover, Bluetooth is just one example signal that may be used to facilitate communication between the building control device 102 and the BAS component 104. Other building control communication protocols may include, 1-Wire, C-Bus, CC-Link Industrial Networks, DSI, Dynet, KNX, LonTalk, oBIX, VSCP, xAP, X10, Z-Wave, INSTEON, TCIP, Ethernet, and/or any other suitable communication scheme. Additionally, it is contemplated that the communication may be uni-directional or bi-directional, as desired.

In some instances, the controller 110 of the building control device 102 and a controller 124 of the remote device 106 may include a pre-programmed chip, such as a very-large-scale integration (VLSI) chip and/or an application specific integrated circuit (ASIC). In such embodiments, the chip may be pre-programmed with control logic in order to control the operation of the building control device 102 or the remote device 106. In some cases, the pre-programmed chip may implement a state machine that performs the desired functions. By using a pre-programmed chip, the controller 110, 124 may use less power than other programmable circuits (e.g. general purpose programmable microprocessors) while still being able to maintain basic functionality. In other instances, the controller 110 and/or the controller 124 may include a programmable microprocessor. Such a programmable microprocessor may allow a user to modify the control logic of the building control device 102 and/or the remote device 106 even after it is installed in the field (e.g. firmware update), which may allow for greater flexibility of the building control device 102 and/or the remote device 106 in the field over using a pre-programmed ASIC.

According to various embodiments, the secondary beacon 108 may permit the building control device 102 to communicate to a transceiver 122 of the remote device 122 or any other remote devices using one or more wireless communication protocols, such as cellular communication, ZigBee, REDLINK™, Bluetooth, IrDA, infra-red (IR), dedicated short range communication (DSRC), EnOcean, radio frequency (RF) signals and/or any other suitable common or proprietary wireless protocol, as desired. In some instances, the secondary beacon 108 may send the status signal indicative of the inspection of the BAS component 104 to the transceiver 122 using any of the above mentioned suitable common or proprietary wireless protocols. Additionally and/or alternatively, the secondary beacon 108 may permit the building control device 102 to communicate to the transceiver 122 of the remote device 106 over one or more wireless networks, such as the network 126, for example. In some cases, the secondary beacon 108 may utilize a wireless protocol to communicate with the transceiver 122 of the remote device 106 over the network 126. In some cases, the network 126 may include a Local Area Networks (LAN) such as a Wi-Fi network and/or a Wide Area Networks (WAN) such as the Internet and/or a cellular network. These are just some examples. In some instances, the secondary beacon 108 may send the status signal indicative of the inspection of the BAS component 104 to the transceiver 122 over any of the above mentioned networks.

In various embodiments, the memory 114 may be operatively coupled to the controller 110 and/or the controller 124 and may be used to store any desired information, such as application programs, component fingerprints 120, network credentials, codes, schedules, building/structure zones, and the like. In some cases, the component fingerprints 120 may include, but is not limited records of the identities of components (e.g., the BAS component 112), the locations of components throughout a structure, and the signal characteristics (e.g., signal strength) of the components. The memory 114 may be any suitable type of storage device including, but not limited to, RAM, ROM, EPROM, flash memory (e.g., NAND flash memory), an external SPI flash memory, a hard drive, and/or the like. In some cases, the memory 114 may include two or more types of memory. For example, the memory 114 may include a RAM, a ROM and a flash memory module.

During operation, the controllers 110, 124 may store information within the memory 114, and may subsequently retrieve the stored information from the memory 114. In some cases, program/utility 116 may be stored in the memory 114 and may include a set of application program modules (e.g. software), such as an ID and positioning system diagnostics application 118. In some cases, the program/utility 116 may include additional program modules as well as an operating system, one or more other application program modules, and/or program data. According to various embodiments, the application program modules (e.g., the positioning system diagnostics application 118) may include component fingerprints 120, for example. In certain embodiments, the positioning system diagnostics application 118, including the component fingerprints 120, may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The positioning system diagnostics application 118 may execute on the building control device 102. In some cases, the positioning system diagnostics application 118 may execute on a remote device (e.g., the remote device 106). In some cases, part of the ID and positioning system diagnostics application 118 may be executed on the building control device 102 and part of the ID and positioning system diagnostics application 118 may be executed on the remote device 106. In either scenario, the ID and positioning system diagnostics application 118 may provide instructions to compare the status signal indicative of the inspection of the BAS component 104 against the fingerprint 120 of the BAS component 104. In some cases, by comparing the status signal against the fingerprint 120, controllers 110 or 124 may determine whether the identity of the BAS component 104 provided by the status signal matches the identity of the BAS component 104 provided by the fingerprint 120 and whether the location of the BAS component 104 provided by the status signal matches the location of the BAS component 104 provided by the fingerprint 120. Moreover, if the identity and the location from the status signal match the identity and the location from the fingerprint 120, the controllers 110 or 124 may observe a difference in the strength of the signal produced by the BAS component 104 provided by the status signal and the strength of the signal produced by the BAS component 104 provided by the fingerprint 120. In some cases, the controllers 110 or 124 may identify whether the difference is outside a range that may be, for example, provided by a user or the ID and positioning system diagnostics application 118 or determined by the controllers 110 or 124. In some instance, if the difference is outside the range, the controllers 110 or 124 may send a notification that there is an issue concerning the BAS component 104 to a user interface 128 that may include a display 130 used to display the notification to a user (e.g., a technician). Additionally, in some instances, if the difference is inside the range, this may indicate that the BAS component 104 is operating properly and is not experiencing any issues. As such, the controllers 110 or 124 may not send a notification to the user interface 128.

In some cases, the controllers 110 or 124 may determine that the identity of the BAS component 104 from the status signal matches the identity of the BAS component 104 from the fingerprint 120, however, the location of the BAS component 104 from the status signal does not match the location of the BAS component 104 from the fingerprint 120. Accordingly, the controllers 110 or 124 may send a notification that the location of the BAS component 104 has changed. Moreover, in this cases, if the difference is also outside the range, the controllers 110 or 124 may send the notification that there is an issue concerning the BAS component 104 and that the issue may be caused by the change in the location of the BAS component 104.

In some cases, the controllers 110 or 124 may determine that the location of the BAS component 104 from the status signal matches the location of the BAS component 104 from the fingerprint 120, however, the identity of the BAS component 104 from the status signal does not match the identity of the BAS component 104 from the fingerprint 120. In this case, the BAS component 104 may have been replaced by another BAS component or the BAS component 104 may have been altered, fixed, or updated. These are just a few examples. In any event, the controllers 110 or 124 may update the fingerprint 120 of the BAS component 104 to include the new identity from the status signal.

In some cases, the controllers 110 or 124 may determine that the location of the BAS component 104 from the status signal does not match a location of the BAS component 104 from the fingerprint 120 and the identity of the BAS component 104 from the status signal does not match an identity of the BAS component 104 from the fingerprint 120. In this case, the BAS component 104 may be new and therefore, does not have a fingerprint. As such, the controllers 110 or 124 may include a fingerprint 120 for the BAS component 104 in the memory 114. The fingerprint 120 may include the identity of the BAS component 104, the location of the BAS component 104, and the signal strength of the signal produced by the BAS component 104 as observed from the status signal.

Figure 2A:
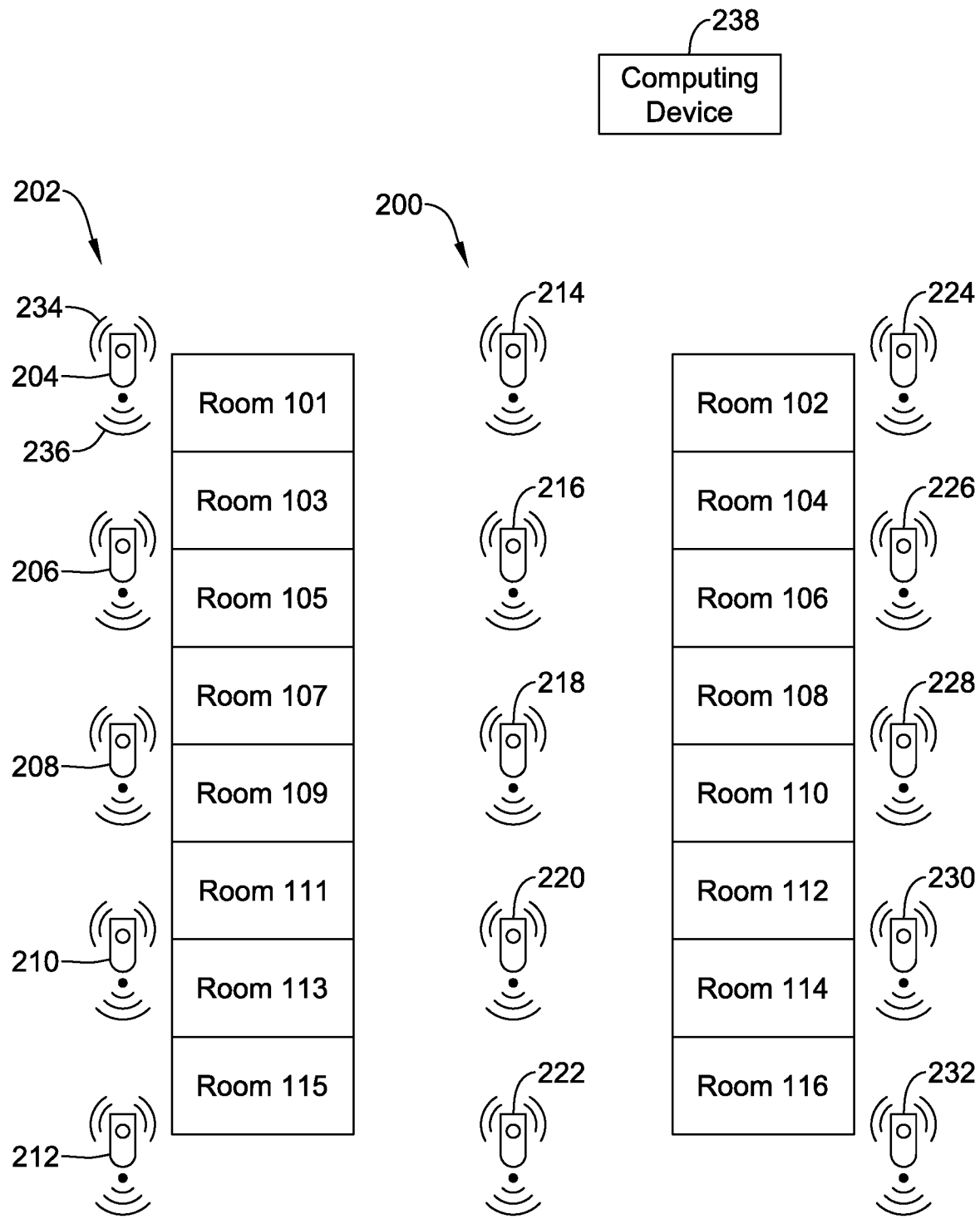
FIG. 2A is a schematic floorplan view of a structure that includes an illustrative identification and positioning system.

FIG. 2A is a schematic floorplan view of a building, house, or other structure 200 that includes an illustrative identification (ID) and positioning system 202. In some cases, the ID and positioning system 202 may operate similar to the ID and positioning system 100, discussed in regard to FIG. 1. As shown, the structure 200 includes Rooms 101-116 and the ID and positioning system 202 includes control devices 204-232. In this example, the control devices 204-232 are battery powered routers. Moreover, routers 204-232 have been deployed in the structure through a standard fingerprinting process used to establish a beacon infrastructure for the ID and positioning system 202. As such, turning to FIG. 2B, a respective received signal strength indicator (RSSI) component fingerprint record 250 may be created for the routers 204-232 and stored in a memory (e.g., memory 114, from FIG. 1). As shown, each router has an entry that includes a component ID 252, a component location 254, and a component strength 256. In other examples, the component fingerprint record 250 may include less or more information, such as information about the space or the environment where the routers 204-232 are located.

Turning back to FIG. 2A, the routers 204-232 may be programmed to identify a mobile device of an occupant of a room and unlock a door to the room when the mobile device of the occupant is detected in front of and outside of the door of the room and lock the door when the mobile device of the occupant is not detected in front of and outside of the door. In particular, Room 101 will be discussed. In this example, router 204 may be designated for identifying the mobile device (not shown) of the occupant of Room 101. In some cases, through the fingerprinting process, the router 204 may be configured with a primary beacon. As such, the battery powered router 204 may be similar to an iBeacon that can be powered with coin cells or with an energy harvesting means. Additionally, the router 204 may be of a class of Bluetooth low energy (BLE) device. Accordingly, the router 204 may recognize the mobile device of the occupant using Bluetooth signals 234. In some cases, the Bluetooth signals 234 may have a frequency between 2 and 3 GHz, a range of 50 to 500 meters, a strength between 1 mW and 100 mW, and a duty cycle between 10 emissions per hour and 10 emissions per second. When the router 204 is present and operating properly, the router 204 may detect when the mobile device of the occupant is in front of and outside of the door of Room 101 and automatically unlock the door of Room 101. Moreover, when the mobile device is inside Room 101 or not in front of and outside of the door of Room 101, the router 204 may automatically lock the door of Room 101.

In some cases, the router 204 or the primary beacon of the router 204 may experience issues that cause the router 204 to not be able to detect the mobile device when the mobile device is in front of and outside of the door of Room 101. For instance, in some cases, the router 204 may deteriorate over time, the router 204 may be tampered with, the router 204 may have parts replaced, and/or the router 204 may be moved, misplaced, or replaced. Accordingly, in this example, the router 204 may be configured with a secondary beacon. In some examples, the secondary beacon may inspect the primary beacon and the secondary beacon may send a status signal 236 to a computing device 238. In some cases, the status signal 236 may include the identity of the router 204, the location of the router 204, and the signal strength of the Bluetooth signal 234 generated by the router 204. In some cases, the status signal 236 sent by the secondary beacon may be a long area communication signal such as, for example, a ZigBee signal (e.g., a 802.15.4 ZigBee packet) or another radio signal (e.g., a Wi-Fi 802.1 radio signal packet). In some cases, the long area communication signal may have a frequency between 1 and 3 GHz, a range of 0.5 to 2 miles when inside a structure and upwards of 7 miles when outside a structure, a strength between 1 W and 100 W, and a duty cycle between 1 emission per hour and 1 emission per week. In some instances, the long area communication signal configuration of the second beacon may provide low cost communication capability with nearby devices (e.g., the computing device 238) with little to no underlying infrastructure. Moreover, the duty cycle at which the status signal 236 is sent from the second beacon may be large compared to the duty cycle at which the primary beacon sends and receives Bluetooth signals 234 for detection of the mobile device. As such, for the secondary beacon to operate, very little extra power may be consumed from the battery of the router 204 by the secondary beacon.

In some cases, when the computing device 238 receives the status signal 236 from the secondary beacon, the computing device 238 may obtain the identity of the router 204 and the location of the router 204 to index through the component fingerprint record 250, shown in FIG. 2B. In some cases, the computing device 238 may identify that the identity of the router 204 and the location of the router 204 from the status signal matches "Router 204" from the component ID 252 and "Outside Room 101" component location 254 from record entry 258. Since either the identity or the location of the router 204 from the status signal 236 matches the record entry 258, the computing device 238 may compare the signal strength of the Bluetooth signal 234 generated by the router 204 from the status signal 236 to the signal strength 256 for the router 204 recorded in the entry 258. As shown, the recorded signal strength 256 is 50 mW. In this example, the computing device 238 may identify that the Bluetooth signal 234 strength is 35 mW. In some cases, the computing device 238 may have instructions that any router (e.g., routers 204-232) that are sending signals that have a signal strength that is less than, for example, 75% of the recorded signal strength 256, may be experiencing issues and should be evaluated. In this example, the computing device 238 may identify that the Bluetooth signal 234 is 35 mW. As such, 35 mW is outside the range of 37.5 mW-50 mW (i.e., 37.5 mW is 75% of 50 mW). Accordingly, the computing device 238 may then send a notification that the router 204 may be experiencing an issue and should be evaluated. This is just one example of how the computing device 238 may evaluate the signal strength of the Bluetooth signal 234 from the status signal 236. In other examples, other percentages or ranges may be used to determine that the router 204 may be experiencing issues. Moreover, in some examples, the computing device 238 may evaluate the signal strength of the Bluetooth signal 234 without using ranges or percentages as described.

Alternatively or additionally, in some cases, the computing device 238 may identify that the identity of the router 204 from the status signal matches "Router 204" from the component ID 252, however, the location of the router 204 from the status signal does not match the "Outside Room 101" component location 254 from record entry 258. In this case, the computing device 238 may send a notification that the location of the router 204 has changed. Moreover, if the Bluetooth signal 234 is also outside the range, as described above, the computing device 238 may also indicate that the issue concerning the router 204 may be caused by the change in the location of the router 204.

Alternatively or additionally, in some cases, the computing device 238 may identify that the location of the router 204 from the status signal matches the "Outside Room 101" component location 254 from the record entry 258, however, the identity of the router 204 from the status signal does not match "Router 204" from the component ID 252. In this case, the router 204 may have been replaced by another router or the router 204 may have been altered, fixed, or updated. These are just a few examples. In any event, the computing device 238 may update the record entry 258 for the router 204 to include the new identity from the status signal.

In some examples, the computing device 238 may determine that a location of a router from a status signal does not match a component location 254 in the component fingerprint record 250 and an identity of a router from the status signal does not match a component ID 252 in the component fingerprint record 250. In this case, the router may be new and therefore, does not have a fingerprint. As such, the computing device 238 may add a record entry in the component fingerprint record 250 for the router. The new record entry for the router may include the identity of the router, the location of the router, and the signal strength of the Bluetooth signal produced by the router as observed from the status signal.

Figure 3A:
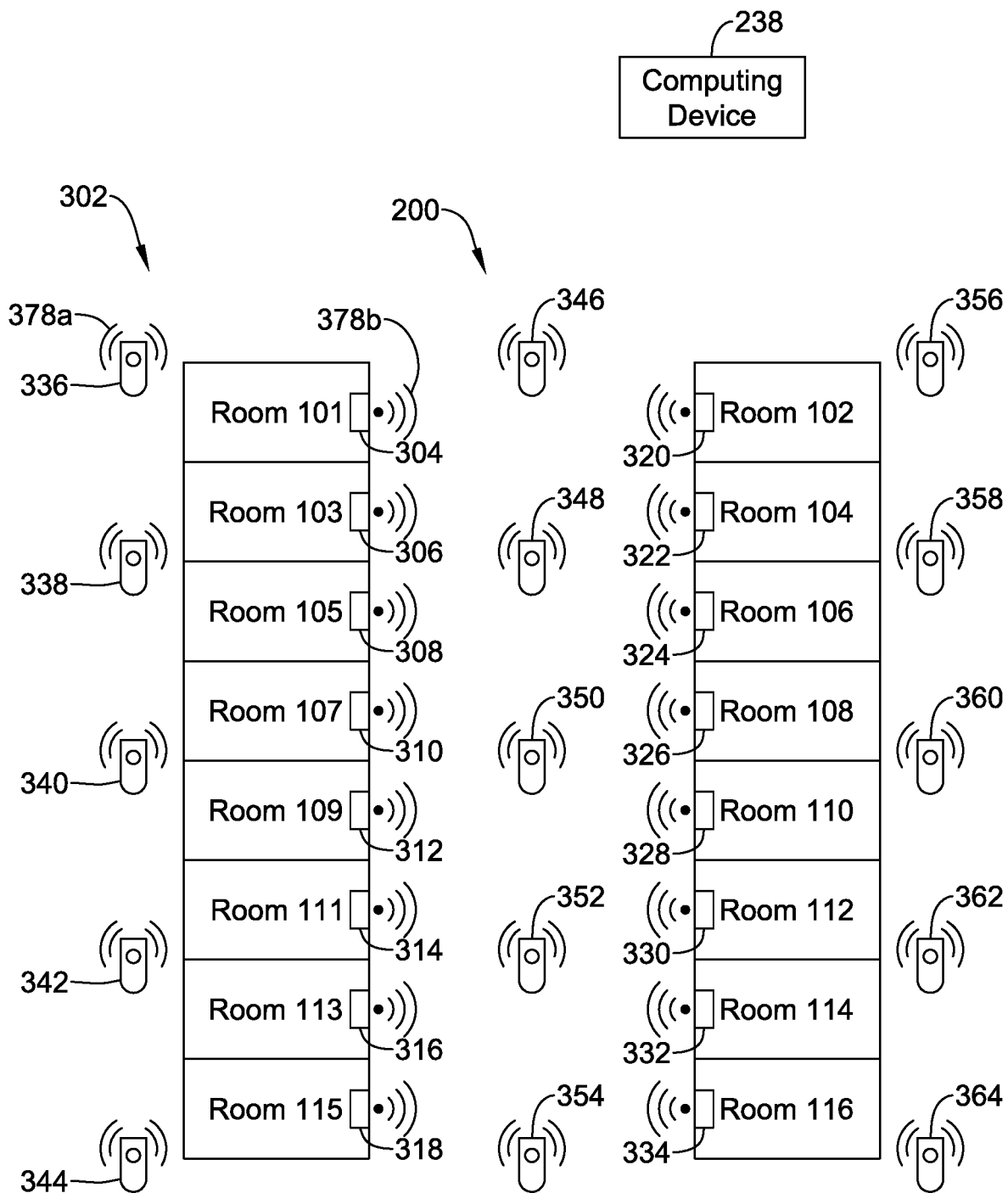
FIG. 3A is the schematic floorplan view of the structure that includes another illustrative identification and positioning system.

FIG. 3A is another schematic floorplan view of the building, house, or other structure 200 that includes another illustrative identification (ID) and positioning system 302. In some cases, the ID and positioning system 302 may operate similar to the ID and positioning systems 100 and 202, discussed in regard to FIG. 1 and FIGS. 2A-2B. As shown, the structure 200 once again includes Rooms 101-116 and the ID and positioning system 302 includes control devices 304-334 and remote HVAC controllers 336-364. In this example, the remote HVAC controllers 336-364 are battery powered and the control device 304-334 are line or solar powered thermostats. Moreover, the thermostats 304-334 may be part of a mesh infrastructure. For example, the mesh infrastructure may have IEEE 802.11 access points, such as an INNCOM™ deep mesh system. Additionally, in some instances, the IEEE standard 802.11 may have a set of media access control (MAC) and physical layer (PHY) specifications for implementing wireless local area network (WLAN) computer communication in the 900 MHz and 2.4, 3.6, 5, and 60 GHz frequency bands. In some cases, the INNCOM deep mesh network (DMN) architecture may provide a very cost effective, self-forming wireless network. INNCOM's deep mesh network may eliminate a need for multiple radios and networks that are densely populated with costly auxiliary routers and a personal area network (PAN) coordinators that support a limited number of rooms. A typical INNCOM network may need only one edge router for up to 100 rooms. This highly efficient architecture may reduce installation costs associated with traditional networks along with ongoing maintenance costs to keep other systems up and running. The deep mesh network may also eliminate or greatly reduce cabling and electrical power requirements necessary to install the other systems. Unlike other network systems, which may need an extensive installation effort, network cabling, and electrical power for devices, the INNCOM DMN may need minimal installation effort, since the network infrastructure may be embedded in thermostats (e.g., thermostats 304-334).

In some cases, the thermostats 304-334 and the remote HVAC controllers 336-364 may have been deployed in the structure through a standard fingerprinting process used to establish a beacon infrastructure for the ID and positioning system 302. In this scenario, the thermostats 304-334 may operate as indicator beacons for not only themselves, but each remote HVAC controller 336-364 may be designated to a particular thermostat. In this configuration, the remote HVAC controllers 336-364 can occasionally operate in a sleep mode and/or shut down to save on battery power. In this example, remote HVAC controller 336 will be designated to thermostat 304 and they will be discussed in regard to Room 101. In some cases, the remote HVAC controller 336 may be of a class of Bluetooth low energy (BLE) device and may include a primary beacon through the standard fingerprinting process. Moreover, the remote HVAC controller 336 may be programmed to control the temperature of Room 101 at one temperature (e.g., 70° F.) when the remote HVAC controller 336 recognizes a mobile device of the occupant of Room 101 using Bluetooth signals 378a. That is, the remote HVAC controller 336 detects that the mobile device and thus, the occupant is in Room 101. Additionally, the remote HVAC controller 336 may be programmed to control the temperature of the room at a second temperature (e.g., 65° F.) when the mobile device is not detected in Room 101.

In some cases, the remote HVAC controller 336 or the primary beacon of the remote HVAC controller 336 may experience issues that cause the remote HVAC controller 336 to not be able to detect the mobile device when the mobile device is in Room 101. For instance, in some cases, the remote HVAC controller 336 may deteriorate over time, the remote HVAC controller 336 may be tampered with, the remote HVAC controller 336 may have parts replaced, and/or the remote HVAC controller 336 may be moved, misplaced, or replaced. Accordingly, in this example, the thermostat 304 may include a secondary beacon through the standard fingerprinting process. As such, the thermostat 304 may be configured to communicate with the remote HVAC controller 336 by exchanging Bluetooth signals 378a and 378b between the primary beacon and the secondary beacon. In some cases, through the fingerprint process, the Bluetooth signals 378a may have information that includes, but is not limited to, the identity of the remote HVAC controller 336, the location of the remote HVAC controller 336 in the structure 200, and a signal strength of the Bluetooth signals 378a. As such, when the secondary beacon receives the Bluetooth signal 378a from the primary beacon, the secondary beacon may send a status signal 378b to the computing device 238 that includes the identity of the remote HVAC controller 336, the location of the remote HVAC controller 336, and the signal strength of the Bluetooth signal 378a.

In some cases, when the computing device 238 receives the status signal 378b from the secondary beacon, the computing device 238 may obtain the identity of the remote HVAC controller 336 and the location of the remote HVAC controller 336 to index through the component fingerprint record 370, shown in FIG. 3B. In some cases, the computing device 238 may identify that the identity of the remote HVAC controller 336 and the location of the remote HVAC controller 336 from the status signal matches "Remote HVAC Controller 336" from the component ID 372 and "Outside Room 101" component location 374 from record entry 380. Since either the identity or the location of the remote HVAC controller 336 from the status signal 378b matches the record entry 380, the computing device 238 may compare the signal strength of the Bluetooth signal 378a generated by the remote HVAC controller 336 from the status signal 378b to the signal strength 376 for the remote HVAC controller 336 recorded in entry 380. As shown, the recorded signal strength 376 is 50 mW. In this example, the computing device 238 may identify that the Bluetooth signal 378a strength is 35 mW. In some cases, the computing device 238 may have instructions that any device (e.g., the remote HVAC controllers 336-364 and the thermostats 304-334) that are sending signals that have a signal strength that is less than, for example, 75% of the recorded signal strength 376, may be experiencing issues and should be evaluated. In this example, the computing device 238 may identify that the Bluetooth signal 378a is 35 mW. As such, 35 mW is outside the range of 37.5 mW-50 mW (i.e., 37.5 mW is 75% of 50 mW). Accordingly, the computing device 238 may then send a notification that the remote HVAC controller 336 may be experiencing an issue and should be evaluated. This is just one example of how the computing device 238 may evaluate the signal strength of the Bluetooth signal 378a from the status signal 378b. In other examples, other percentages or ranges may be used to determine that a remote HVAC controller or a thermometer may be experiencing issues. Moreover, in some examples, the computing device 238 may evaluate the signal strength of a Bluetooth signal without using ranges or percentages as described.

Alternatively or additionally, in some cases, the computing device 238 may identify that the identity of the remote HVAC controller 336 from the status signal 378b matches "Remote HVAC Controller 336" from the component ID 372, however, the location of the remote HVAC controller 336 from the status signal 378b does not match the "Outside Room 101" component location 374 from record entry 380. In this case, the computing device 238 may send a notification that the location of the remote HVAC controller 336 has changed. Moreover, if the Bluetooth signal 378a is also outside the range, as described above, the computing device 238 may also indicate that the issue concerning the remote HVAC controller 336 may be caused by the change in the location of the remote HVAC controller 336.

Alternatively or additionally, in some cases, the computing device 238 may identify that the location of the remote HVAC controller 336 from the status signal 378b matches the "Outside Room 101" component location 374 from the record entry 380, however, the identity of the remote HVAC controller 336 from the status signal 378b does not match "Remote HVAC Controller 336" from the component ID 372. In this case, the remote HVAC controller 336 may have been replaced by another remote HVAC controller or the remote HVAC controller 336 may have been altered, fixed, or updated. These are just a few examples. In any event, the computing device 238 may update the record entry 380 for the remote HVAC controller 336 to include the new identity from the status signal 378b.

In some examples, the computing device 238 may determine that a location of a thermostat or a remote HVAC controller from a status signal does not match a component location 374 in the component fingerprint record 370 and an identity of a thermostat or a remote HVAC controller 336 from the status signal does not match a component ID 372 in the component fingerprint record 370. In this case, the thermostat or the remote HVAC controller may be new and therefore, does not have a fingerprint. As such, the computing device 238 may add a record entry in the component fingerprint record 370 for the thermostat or the remote HVAC controller. The new record entry for the thermostat or the remote HVAC controller may include the identity, the location, and the signal strength of the Bluetooth signal produced by the thermostat or the remote HVAC controller as observed from the status signal.

Figure 4:
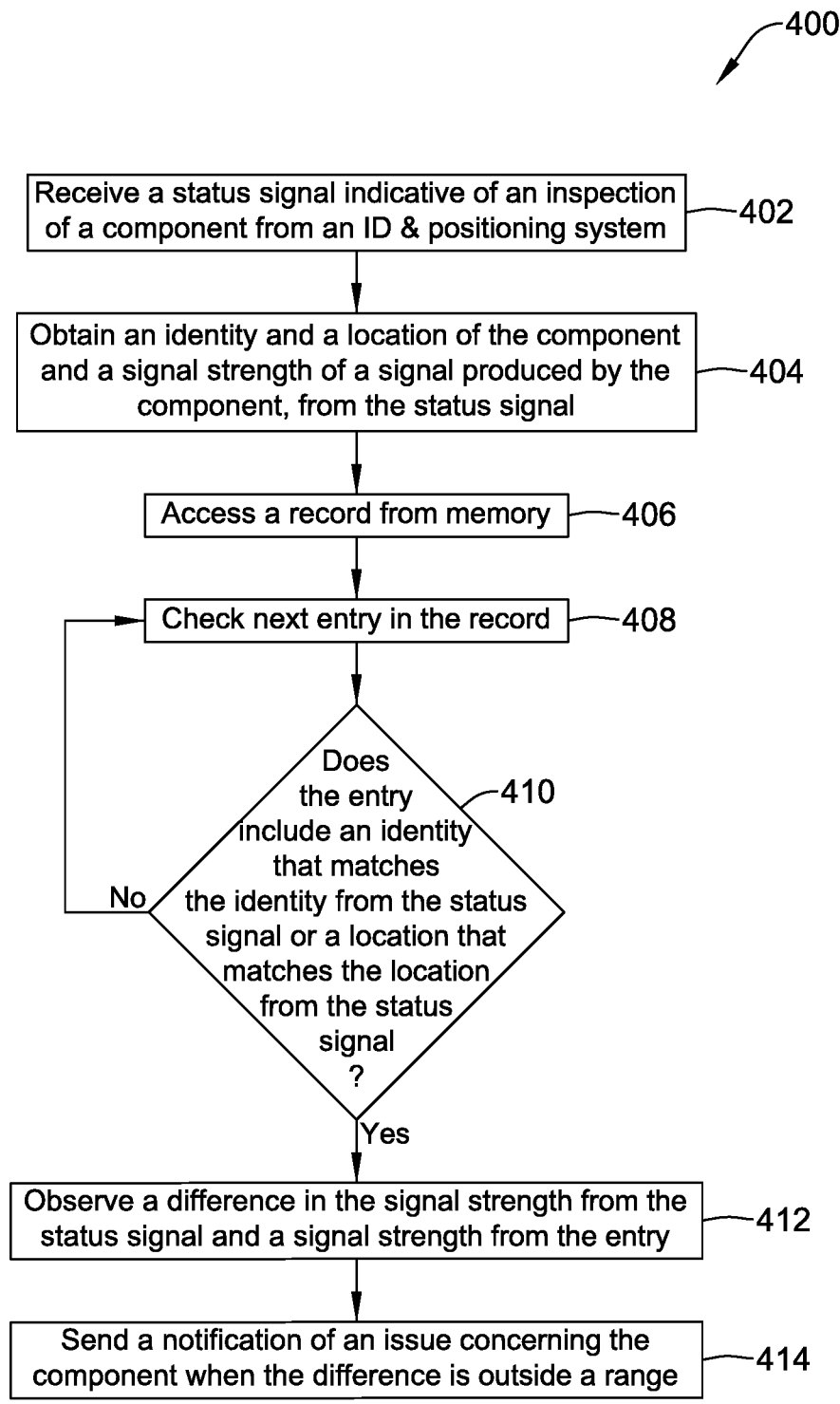
FIG. 4 is a flow chart showing an illustrative method of monitoring an identification and positioning system.

FIG. 4 illustrates an illustrative method 400 of monitoring an identification (ID) and positioning system of a structure. The method 400 begins at step 402 where a status signal from a transceiver indicative of an inspection of a component from the ID and positioning system is received. At step 404, an identity of the component, a location of the component relative to the structure, and a signal strength of a signal produced by the component is obtained from the status signal. At step 406, a record from a memory is accessed and at step 408, the next entry in the record is checked. At step 410, it is determined whether the entry from the record includes an identity of the component or a location of the component that matches the obtained identity of the component or the obtained location of the component from the status signal. If it is determined that neither the identity of the component nor the location of the component from the entry matches the obtained identity of the component or the obtained location of the component from the status signal, the next entry in the record is checked. If it is determined that either the identity of the component or the location of the component from the entry matches the obtained identity of the component or the obtained location of the component from the status signal, at step 412, a difference in the obtained signal strength of the signal produced by the component and a signal strength from the entry is observed. At step 414, a notification of an issue concerning the component is sent when the difference in the obtained signal strength of the signal produced by the component and the signal strength from the entry is outside a range.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A building control device, comprising:
a microprocessor coupled to a memory, wherein both the microprocessor and the memory are included in a housing of the building control device, and wherein the microprocessor is configured to:
determine whether a signal strength of a status signal produced by a component matches a fingerprint of the component stored in the memory; and
send a notification of an issue concerning the component when a difference in the signal strength of the signal produced by the component and a signal strength obtained from the fingerprint is outside a range.

2. The device of claim 1, wherein when an identity of the component obtained from the fingerprint does not match an obtained identity of the component from the status signal, the microprocessor is configured to update the identity of the component from the fingerprint to the identity of the component from the status signal.

3. The device of claim 1, wherein when a location of the component obtained from the fingerprint does not match an obtained location of the component from the status signal, the microprocessor is configured to send a notification that the location of the component has changed.

4. The device of claim 3, wherein the notification of the issue concerning the component is sent in response to a change of the location of the component.

5. The device of claim 1, wherein when an obtained location and an obtained identity of the component from the status signal do not match the fingerprint, the microprocessor is configured to update the memory to include the location, the identity and the signal strength of a signal produced by the component.

6. The device of claim 1, wherein the device is a router.

7. The device of claim 6, wherein the router is configured to communicate with a transceiver of the component using a Zigbee signal.

8. The device of claim 6, wherein the router is configured to communicate with a transceiver of the component using a radio signal.

9. The device of claim 6, wherein the router is configured to communicate with a transceiver of the component using a Bluetooth signal.

10. The device of claim 1, wherein the device is a router.

11. The device of claim 10, wherein the router is configured to communicate with a transceiver of the component using a Zigbee signal.

12. The device of claim 10, wherein the router is configured to communicate with a transceiver of the component using a radio signal.

13. The device of claim 10, wherein the router is configured to communicate with a transceiver of the component using a Bluetooth signal.

14. A method of monitoring an identification and positioning system of a structure, the method comprising:
   determining whether a fingerprint of a component obtained from a memory includes an identity of the component or a location of the component that matches an obtained identity of the component or an obtained location of the component from a status signal produced by the component; and
   sending a notification of an issue concerning the component when a difference in the obtained signal strength of the signal produced by the component and the signal strength from the fingerprint is outside a range.

15. The method of claim 14, wherein sending a notification of an issue concerning the component is sent in response to a change of the location of the component.

16. An identification and positioning system of a structure comprising:
   a set of components of the identification and positioning system; and
   a device including a microprocessor coupled to a memory, wherein the microprocessor is configured to:
      determine whether a signal strength of a status signal produced by a component of the set of components matches a fingerprint of the component stored in the memory; and
      send a notification of an issue concerning the component when a difference in the signal strength of the signal produced by the component and a signal strength obtained from the fingerprint is outside a range.

17. The device of claim 16, wherein when an identity of the component obtained from the fingerprint does not match an obtained identity of the component from the status signal, the microprocessor is configured to update the identity of the component from the fingerprint to the identity of the component from the status signal.

18. The device of claim 16, wherein when a location of the component obtained from the fingerprint does not match an obtained location of the component from the status signal, the microprocessor is configured to send a notification that the location of the component has changed.

19. The device of claim 18, wherein the notification of the issue concerning the component is sent in response to a change of the location of the component.

20. The device of claim 16, wherein an obtained location and an obtained identity of the component from the status signal do not match the fingerprint, the microprocessor is configured to update the memory to include the location, the identity and the signal strength of a signal produced by the component.

* * * * *